US008477278B1

(12) United States Patent
Yu et al.

(10) Patent No.: US 8,477,278 B1
(45) Date of Patent: Jul. 2, 2013

(54) LIQUID CRYSTAL DISPLAY PANEL

(71) Applicant: Hannstar Display Corporation, New Taipei (TW)

(72) Inventors: Chia-Hua Yu, New Taipei (TW); Kun-Cheng Lee, Tainan (TW); I-Fang Wang, Changhua County (TW); Feng-Wei Kuo, Pingtung County (TW)

(73) Assignee: Hannstar Display Corp., New Taipei (TW)

( * ) Notice: Subject to any disclaimer, the term of this patent is extended or adjusted under 35 U.S.C. 154(b) by 0 days.

(21) Appl. No.: 13/667,868

(22) Filed: Nov. 2, 2012

(30) Foreign Application Priority Data

Oct. 30, 2012 (CN) .......................... 2012 1 0424713

(51) Int. Cl.
- *G02F 1/1343* (2006.01)
- *G02F 1/136* (2006.01)
- *C09K 19/02* (2006.01)

(52) U.S. Cl.
USPC .............................. 349/139; 349/42; 349/179

(58) Field of Classification Search
USPC ........ 349/38–43, 139–143, 177–181; 257/59, 257/72
See application file for complete search history.

(56) References Cited

U.S. PATENT DOCUMENTS

| | | | |
|---|---|---|---|
| 6,256,080 B1 | 7/2001 | Colgan et al. | |
| 7,123,336 B2 | 10/2006 | Toriyama et al. | |
| 7,414,691 B2 | 8/2008 | Park et al. | |
| 7,420,641 B2 | 9/2008 | Lee et al. | |
| 7,480,431 B2 | 1/2009 | Liou et al. | |
| 7,502,092 B2 | 3/2009 | Park et al. | |
| 7,505,105 B2 | 3/2009 | Inoue et al. | |
| 7,550,767 B2 | 6/2009 | Yang et al. | |
| 7,551,250 B2 * | 6/2009 | Okumura | 349/117 |
| 7,576,827 B2 | 8/2009 | Lee et al. | |
| 7,847,896 B2 | 12/2010 | Jeon et al. | |
| 7,927,930 B2 | 4/2011 | Park | |
| 8,003,007 B2 * | 8/2011 | Hong et al. | 252/299.66 |
| 8,107,027 B2 | 1/2012 | Kim | |
| 8,169,558 B2 * | 5/2012 | Morimoto et al. | 349/38 |
| 8,325,305 B2 * | 12/2012 | You et al. | 349/129 |
| 2003/0095225 A1 | 5/2003 | Hsu et al. | |
| 2006/0109409 A1 | 5/2006 | Lai | |
| 2009/0115944 A1 | 5/2009 | Jeon et al. | |
| 2009/0225248 A1 | 9/2009 | Kim et al. | |
| 2010/0066933 A1 | 3/2010 | Oh et al. | |
| 2011/0157507 A1 | 6/2011 | Koh | |
| 2012/0193630 A1 | 8/2012 | Ham et al. | |

\* cited by examiner

*Primary Examiner* — Dung Nguyen

(74) *Attorney, Agent, or Firm* — Volpe and Koenig, P.C.

(57) ABSTRACT

A liquid crystal display panel includes a pixel array substrate, an opposite substrate, and a twisted nematic (TN) liquid crystal layer located between the two substrates. The pixel array substrate includes a first substrate, gate lines, data lines, thin film transistors (TFTs) coupled to the gate lines and the data lines, a first insulation layer, a transparent conductive layer, a second insulation layer, and pixel electrodes coupled to the TFTs through contact holes in the first and second insulation layers. The first insulation layer covers the gate lines, the data lines, and the TFTs. The transparent conductive layer, the second insulation layer, and the pixel electrodes are sequentially stacked on the first insulation layer and constitute a storage capacitor. A phase retardation value of the TN liquid crystal layer ranges from 250 to 480, and a dielectric anisotropy $\Delta\varepsilon$ of the TN liquid crystal layer ranges from 3 to 10.

11 Claims, 12 Drawing Sheets

LIQUID CRYSTAL DISPLAY PANEL

CROSS-REFERENCE TO RELATED APPLICATION

This application claims the priority benefit of China application serial no. 201210424713.1, filed Oct. 30, 2012. The entirety of the above-mentioned patent application is hereby incorporated by reference herein and made a part of this specification.

BACKGROUND OF THE INVENTION

1. Field of the Invention

The invention relates to a display technology and more particularly to a liquid crystal display (LCD) panel.

2. Description of Related Art

Recently, flat panel displays have been rapidly developed to gradually replace conventional cathode ray tube (CRT) displays. The flat panel displays may be classified into organic light-emitting diode (OLED) displays, plasma display panels (PDP), liquid crystal displays (LCD), field emission displays (FED), and so on. According to the manner in which a liquid crystal material is twisted, the LCD may be further categorized into a twisted nematic (TN) LCD and an in-plane switching (IPS) LCD.

With the development of display products with high brightness and high resolution, the technologies including a high aperture ratio (HAR) and the color-filter-on-array (COA) technology have been extensively applied to the LCD. However, the requirement for display resolution is correspondingly growing due to the advance of various operation systems (OS) of smart phones, e.g., Mac OS, Android, Window Mango, etc. To enhance the resolution and meanwhile maintain the HAR of pixels in the display, the distance between pixel electrodes and data lines continues to be shortened, and thereby arrangement of liquid crystal molecules may be altered because of the voltage changes of the data lines. As the liquid crystal molecules are arranged in a different manner, the light leakage effect occurred at the edges of the pixel electrode may correspondingly occur. Therefore, improvement of the LCD technology is still necessary.

SUMMARY OF THE INVENTION

The invention is directed to a liquid crystal display (LCD) panel which may resolve an issue of edge light leakage of pixels and may increase flexibility of product design.

In an embodiment of the invention, an LCD panel that includes a pixel array substrate, an opposite substrate, and a twisted nematic (TN) liquid crystal layer is provided. The pixel array substrate includes a first substrate, a plurality of gate lines, a plurality of data lines, a plurality of thin film transistors (TFT), a first insulation layer, a transparent conductive layer, a second insulation layer, and a plurality of pixel electrodes. The gate lines and the data lines are disposed on the first substrate. Each of the TFTs has a first end, a second end, and a third end. The first end is coupled to one of the gate lines, and the second end is coupled to one of the data lines. The first insulation layer covers the gate lines, the data lines, and the TFTs. The transparent conductive layer is disposed on the first insulation layer to provide a common voltage, and the transparent conductive layer at least covers the data lines. The second insulation layer covers the transparent conductive layer and the first insulation layer, and a plurality of contact holes is formed in the first and second insulation layers. The contact holes expose the third ends of the TFTs. The pixel electrodes are disposed on the second insulation layer and coupled to the TFTs through the contact holes. Here, the second insulation layer is located between the transparent conductive layer and the pixel electrodes and isolates the transparent conductive layer from the pixel electrodes, and the transparent conductive layer, the second insulation layer, and one of the pixel electrodes constitute a storage capacitor. The opposite substrate is opposite to the pixel array substrate and includes a second substrate and a common electrode layer that is located on the second substrate. The TN liquid crystal layer is located between the pixel array substrate and the opposite substrate. Here, a phase retardation value of the TN liquid crystal layer ranges from 250 to 480, and dielectric anisotropy $\Delta\varepsilon$ of the TN liquid crystal layer ranges from 3 to 10.

According to an embodiment of the invention, the transparent conductive layer includes a plurality of first openings, the first openings are greater than the contact holes, and the contact holes are located within the first openings. The transparent conductive layer further includes a plurality of second openings respectively located above the TFTs, for instance. In another embodiment of the invention, the transparent conductive layer may further include a plurality of second openings respectively located above the gate lines. Besides, each of the contact holes may include a first through hole and a second through hole. Each of the first through holes penetrates the first insulation layer, each of the second through holes penetrates the second insulation layer, and the second insulation layer covers sidewalls of the first openings of the transparent conductive layer.

According to an embodiment of the invention, a material of the first insulation layer includes an inorganic insulation material and an organic insulation material. The inorganic insulation material includes silicon oxide, silicon nitride, silicon oxynitride, or a combination thereof. The organic insulation material includes acrylic, epoxy resin, a color filter material, or a combination thereof.

According to an embodiment of the invention, a thickness of the first insulation layer ranges from about 0.2 µm to about 3 µm.

According to an embodiment of the invention, the LCD panel further includes a color filter layer that is located on the opposite substrate and between the second substrate and the common electrode layer.

According to an embodiment of the invention, a bend elastic constant K33 of the TN liquid crystal layer ranges from about 8 pN to about 22 pN.

In view of the foregoing, the transparent conductive layer of the pixel array substrate in the LCD panel described herein is located above the data lines; thereby, the transparent conductive layer and the pixel electrodes together constitute the storage capacitor, and the aperture ratio of the LCD panel with high resolution may be raised. Moreover, the capacitance coupling effect generated between the pixel electrodes and the components (i.e., the data lines, the gate lines, the TFTs, or a combination thereof) below the transparent conductive layer may be prevented by the shielding of the transparent conductive layer. As such, the issue regarding the liquid crystal molecules of the liquid crystal layer disturbed by signals on the data lines or other components may be resolved, and the edge light leakage may be rectified. Less edge light leakage may result in the large material selection margin of the liquid crystal layer and sufficient design flexibility of the LCD panel.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 shows a cross-section of the pixel array substrate taken along a sectional line I-I' depicted in FIG. 2.

DESCRIPTION OF EMBODIMENTS

Features and effects of a liquid crystal display (LCD) panel are elaborated in the embodiments below with reference to the drawings.

Figure 1:
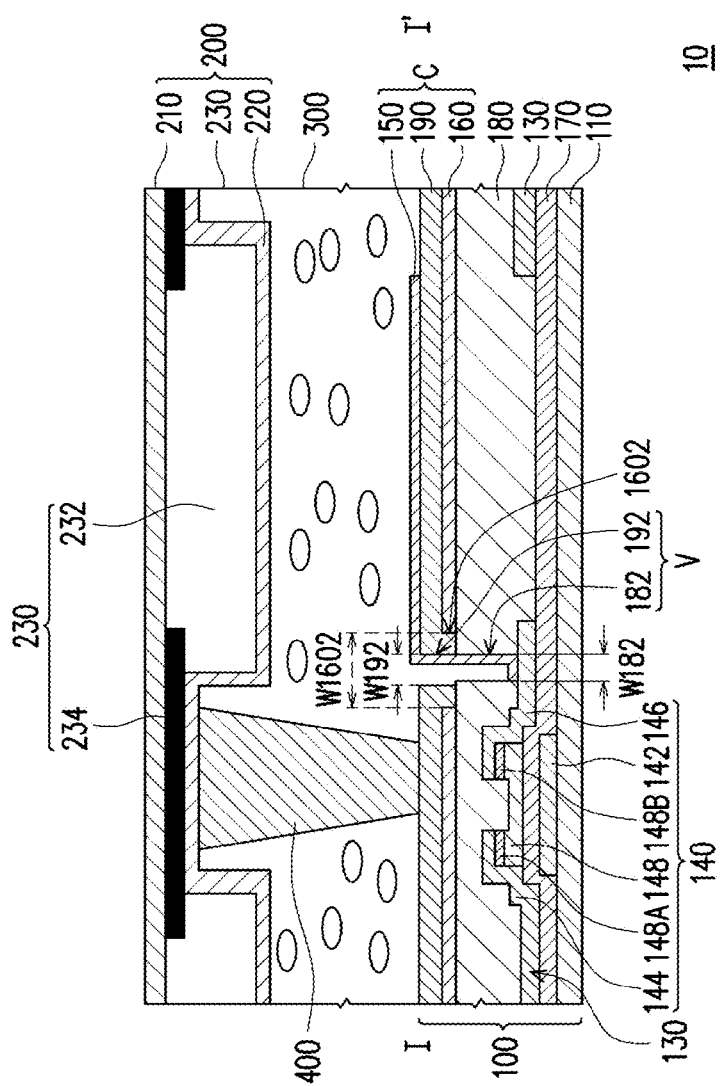
FIG. 1 is a schematic cross-sectional view illustrating a liquid crystal display (LCD) panel according to a first embodiment of the invention.
Figure 2:
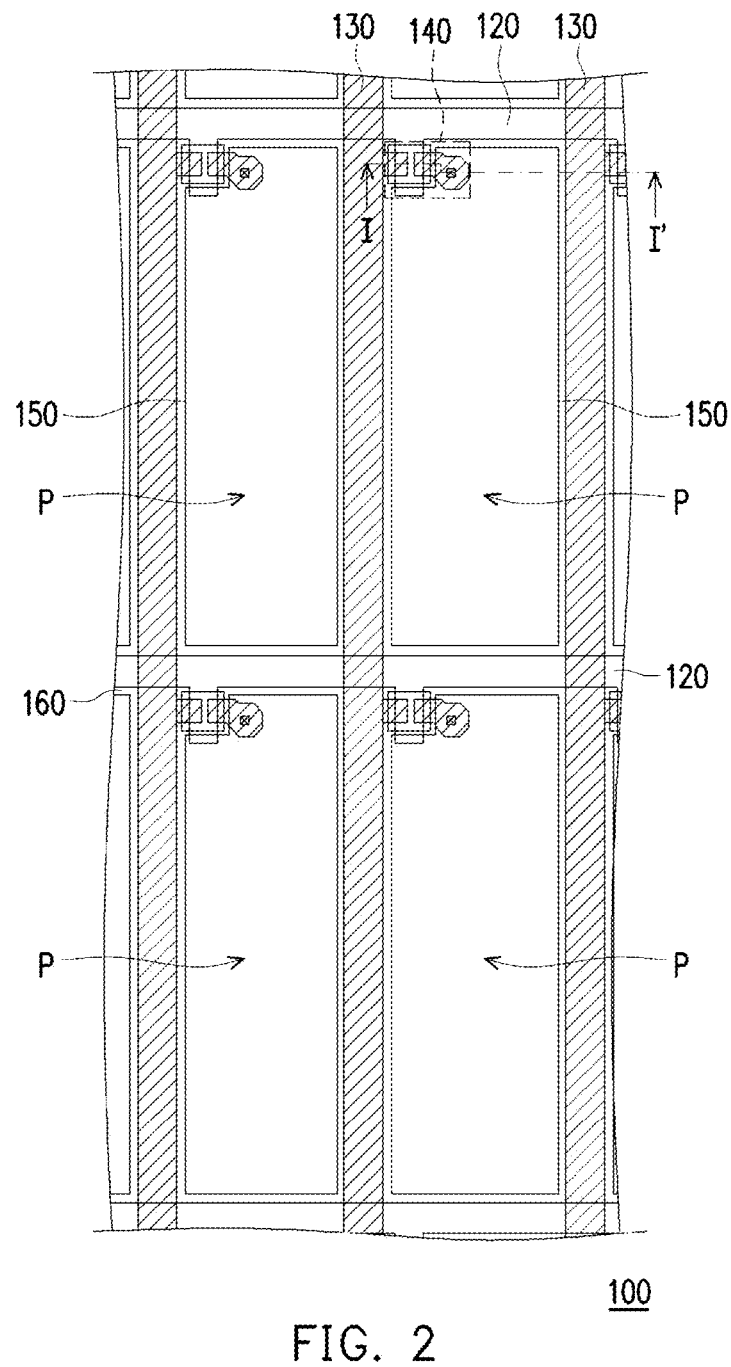
FIG. 2 is a schematic top view illustrating the pixel array substrate of the LCD panel depicted in FIG. 1. Here.

FIG. 1 is a schematic cross-sectional view illustrating an LCD panel according to a first embodiment of the invention. FIG. 2 is a schematic top view illustrating the pixel array substrate of the LCD panel depicted in FIG. 1. Here, FIG. 1 shows a cross-section of the pixel array substrate taken along a sectional line I-I' depicted in FIG. 2. With reference to FIG. 1 and FIG. 2, the LCD panel 10 includes a pixel array substrate 100, an opposite substrate 200, and a twisted nematic (TN) liquid crystal layer 300. The pixel array substrate 100 and the opposite substrate 200 are opposite to each other, and the TN liquid crystal layer 300 is sandwiched between the pixel array substrate 100 and the opposite substrate 200. In the present embodiment, the LCD panel 10 includes at least one spacer 400 for maintaining the distance (or the gap) between the pixel array substrate 100 and the opposite substrate 200. Here, the spacer 400 is a column-shaped spacer; in another embodiment, the spacer 400 may have a ball shape, e.g., a glass ball.

The pixel array substrate 100 includes a first substrate 110 and a plurality of components located on the first substrate 110. Here, the first substrate 110 serves to hold the components and may be a transparent substrate. As shown in FIG. 1 and FIG. 2, the components located on the first substrate 110 include a plurality of gate lines 120, a plurality of data lines 130, a plurality of thin film transistors (TFT) 140, a plurality of pixel electrodes 150, a transparent conductive layer 160, a gate insulation layer 170, a first insulation layer 180, and a second insulation layer 190.

The gate lines 120, the data lines 130, the TFTs 140, and the pixel electrodes 150 together constitute a pixel array, for instance. The gate lines 120 are substantially parallel to a first direction, the data lines 130 are substantially parallel to a second direction, and the first direction intersects the second direction or is orthogonal to the second direction. Hence, the gate lines 120 and the data lines 130 define a plurality of pixel regions P, for instance. Each of the TFTs 140 is coupled to one of the gate lines 120 and one of the data lines 130. The pixel electrodes 150 are coupled to the corresponding TFTs 140, and each of the pixel electrodes 150 is located in a corresponding pixel region P.

As shown in FIG. 1, each of the TFTs 140 includes a first end 142, a second end 144, a third end 146, and a channel layer 148. The first end 142 is connected to a corresponding one of the gate lines 120, the second end 144 is connected to a corresponding one of the data lines 130, and the third end 146 is connected to one of the pixel electrodes 150. Here, the first, second, and third ends 142, 144, and 146 may be considered as a gate, a source, and a drain. In each TFT 140, the channel layer 148 is located above the first end 142. The second and third ends 144 and 146 are located on and coupled to the channel layer 148. Here, the second and third ends 144 and 146 are separated from each other and are substantially located at two sides of the first end 142. In an embodiment of the invention, the channel layer 148 may include an ohmic contact layer 148A in contact with the second end 144 and an ohmic contact layer 148B in contact with the third end 146. Here, the ohmic contact layers 148A and 148B are not connected to each other.

The first ends 142 of the TFTs 140 and the gate lines 120 may be fabricated by performing the same photolithography-etching process. Generally, the first ends 142 of the TFTs 140 and the gate lines 120 refer to a first metal layer (also named as M1). The first ends 142 of the TFTs 140 may directly serve as parts of the gate lines 120. That is, the first metal layer (M1) may include a plurality of metal lines acting as the gate lines 120, and parts of the metal lines serve as the first ends 142 of the TFTs 140. In another embodiment of the invention, the first ends 142 of the TFTs 140 may also be block patterns extending from the gate lines 120. Namely, the first metal layer (M1) may include a plurality of metal lines acting as the gate lines 120 and a plurality of block patterns acting as the first ends 142 of the TFTs 140, and each of the block patterns extends from one of the metal lines.

In addition, the gate insulation layer 170 described herein covers the first ends 142 of the TFTs 140 and covers the gate lines 120 shown in FIG. 2. The gate insulation layer 170 may be made of an inorganic material, e.g., silicon oxide ($SiO_x$), silicon nitride ($SiN_x$), silicon oxynitride, any other suitable dielectric material, or a combination of the above, but the invention is not limited thereto. Here, the gate lines 120 and the first ends 142 are all located between the gate insulation layer 170 and the first substrate 110, and the data lines 130, the second ends 144, the third ends 146, and the channel layers 148 are all located on the other side of the gate insulation layer 170 away from the first substrate 110. The configuration of the gate insulation layer 170 may thus prevent short circuit between the gate lines 120 and other components and between the first ends 142 and other components.

In each of the TFTs 140, the channel layer 148 is located between the first and second ends 142 and 144 and between the first and third ends 142 and 146. In an embodiment of the invention, the channel layer 148 of the TFT 140 may be an island-shaped semiconductor pattern layer formed by performing a photolithography-etching process. Here, the channel layer 148 may be made of amorphous silicon, polysilicon, a metal oxide semiconductor material, an organic semiconductor material, or any other appropriate semiconductor material, which should however not be construed as a limitation to the invention. The ohmic contact layers 148A and 148B may be made of doped amorphous silicon, doped polysilicon, doped metal oxide semiconductor material, any other appropriate doped semiconductor material, or any other material that may enhance the electric contact between metal and a semiconductor material.

The second ends 144 and the third ends 146 of the TFTs 140 as well as the data lines 130 may be formed by performing the same photolithography-etching process. Generally, the second ends 144 and the third ends 146 of the TFTs 140 as well as the data lines 130 refer to a second metal layer (M2). In an embodiment of the invention, the second ends 144 of the TFTs 140 may directly serve as parts of the data lines 130. That is, the second metal layer M2 may include a plurality of metal lines acting as the data lines 130 and a plurality of first parts acting as the third ends 146 of the TFTs 140, wherein the second ends 144 of the TFTs 140 may be parts of the metal lines. In another embodiment of the invention, the second ends 144 of the TFTs 140 may also be block patterns extending from the data lines 130. Namely, the second metal layer M2 may include a plurality of metal lines acting as the data lines 130, a plurality of first parts acting as the third ends 146 of the TFTs 140, and a plurality of block patterns acting as the second ends 144 of the TFTs 140, and each of the block patterns extends from one of the metal lines.

The first insulation layer 180 covers the gate lines 120, the data lines 130, and the TFTs 140, such that the gate lines 120, the data lines 130, and the TFTs 140 are located between the first insulation layer 180 and the first substrate 110. Here, the first insulation layer 180 may be made of a transparent material or a semi-transparent material and may act as a planarization layer. When the first insulation layer 180 acts as the planarization layer, a thickness of the first insulation layer 180 may range from about 0.2 μm to about 5 μm; when the first insulation layer 180 is made of the transparent material, the thickness of the first insulation layer 180 may range from about 0.2 μm to about 3 μm; when the first insulation layer 180 is made of the semi-transparent material, the thickness of the first insulation layer 180 may range from about 1 μm to about 5 μm. The transmittance rate of the transparent material may reach 60% to 90% approximately, and the transmittance rate of the semi-transparent material may reach 10% to 60% approximately. Note that these values are merely exemplary and should not be construed as limitations to the invention. The semi-transparent material may be a color filter material, e.g., a red, a blue, or a green material. When the first insulation layer 180 is made of the color filter material, the first insulation layer 180 may act as a color filter layer. According to an embodiment of the invention, the first insulation layer 180 may be made of an organic insulation material, an inorganic insulation material, or a number of insulation materials stacked together. Here, the organic insulation material includes, for instance, epoxy resin, benzocyclobutene (BCB), photo acryl, and so on; the inorganic insulation material includes, for instance, $SiO_2$, $SiN_x$, or any other similar inorganic material. However, the invention is not limited thereto.

The transparent conductive layer 160 is located on the first insulation layer 180, and the second insulation layer 190 covers the transparent conductive layer 160 and the first insulation layer 180. Therefore, the transparent conductive layer 160 is sandwiched between the first insulation layer 180 and the second insulation layer 190, and the second insulation layer 190 is sandwiched between the transparent conductive layer 160 and the pixel electrodes 150. That is, the transparent conductive layer 160 and the pixel electrodes 150 are electrically insulated from each other by the second insulation layer 190. Here, the second insulation layer 190 may be made of a transparent material or a semi-transparent material and may act as a passivation layer. A material of the second insulation layer 190 may be an organic insulation material, an inorganic insulation material, or a combination of the above. The organic insulation material includes, for instance, epoxy resin, BCB, photo acryl, and so on; however, the invention is not limited thereto. The inorganic material includes, for instance, $SiO_2$, $SiN_x$, or any other similar inorganic material; however, the invention is not limited thereto. Note that the first and second insulation layers 180 and 190 may be selectively made of the same material or different materials.

In order for the pixel electrodes 150 to be coupled to the third ends 146 of the TFTs 140, the LCD panel 10 has contact holes V that penetrate the first and second insulation layers 180 and 190 and expose the third ends 146 of the TFTs 140. At this time, the pixel electrodes 150 may be electrically connected to the third ends 146 of the TFTs 140 through the contact holes V. Here, each of the contact holes V includes a first through hole 182 and a second through hole 192, the first through hole 182 penetrates the first insulation layer 180, and the second through hole 192 penetrates the second insulation layer 190. Particularly, the first and second through holes 182 and 192 may be formed by performing a photolithography-etching process. A width W182 of the first through holes 182 may be no larger than, i.e., smaller than or equal to, a width W192 of the second through holes 192, such that the contact holes V may have continuous sidewalls, and that the pixel electrodes 150 may continuously cover the sidewalls of the contact holes V.

According to the present embodiment, the transparent conductive layer 160 located between the first and second insulation layers 180 and 190 may have openings 1602 that may respectively expose the contact holes V. Here, a width W1602 of the openings 1602 may be greater than the width W182 of the first through holes 182 and may be greater than the width W192 of the second through holes 192. In other words, the area of the contact holes V in the present embodiment may be smaller than the area of the openings 1602 of the transparent conductive layer 160. Thereby, the second insulation layer 190 is able to cover the sidewalls of the opening s1602, so as to prevent the pixel electrodes 150 and the transparent conductive layer 160 from contacting or electrically connecting each other. At his time, the area of each contact hole V is within the area of one corresponding opening 1602, for instance. The transparent conductive layer 160 and the pixel electrodes 150 are made of a transparent conductive material and may be made of the same material or different materials. The transparent material includes but is not limited to indium tin oxide (ITO) or indium zinc oxide (IZO).

According to the above descriptions, the pixel array substrate 100 described in the present embodiment may be formed with use of seven masks. The first mask is employed to form the first metal layer that includes the gate lines 120 and the first ends 142 of the TFTs 140; the second mask is employed to form the channel layers 148 of the TFTs 140; the third mask is employed to form the second metal layer that includes the data lines 130, the second ends 144 of the TFTs 140, and the third ends 146 of the TFTs 140; the fourth mask is employed to form the first through holes 182 in the first insulation layer 180; the fifth mask is employed to form the openings 1602 in the transparent conductive layer 160; the sixth mask is employed to form the second through holes 192 in the second insulation layer 190; the seventh mask is employed to form the pixel electrodes 150. Certainly, the invention is not limited thereto, and in another embodiment of the invention, the fourth and sixth masks may be collectively employed, i.e., one mask may be omitted. In addition, according to another embodiment of the invention, the first mask may be omitted, while the first metal layer may be formed by printing. The seventh mask may also be optionally omitted, while the patterns required for forming the pixel electrodes 150 may be made by laser cutting or lift-off. The second and third masks maybe collectively employed as well, and the second metal layer and the channel layers may be formed with use of a half-tone mask or a gray mask.

In the present embodiment, the opposite substrate 200 includes a second substrate 210, a common electrode layer 220, and a color filter layer 230. The color filter layer 230 is located between the common electrode layer 220 and the second substrate 210 and includes color patterns 232 and light-shielding patterns 234. The light-shielding patterns 234 may often have a lattice-like appearance, and the color patterns 232 are configured in the openings of the lattice-like light-shielding patterns 234. Generally, the layout area of the light-shielding patterns 234 is substantially located above the gate lines 120 and the data lines 130. The layout area of the light-shielding patterns 234 may also be optionally located above the TFTs 140. In the case that the first insulation layer 180 on the pixel array substrate 100 is made of a color filter material, the first insulation layer 180 may act as the color filter layer, and the color filter layer on the opposite substrate 200 of the LCD panel 10 may be omitted in another embodiment of the invention. As such, the LCD panel 10 may have the color-filter-on-array (COA) structure, i.e., the color filter layer may be located on the pixel array substrate 100.

The TN liquid crystal layer 300 is located between the pixel array substrate 100 and the opposite substrate 200. When the LCD panel 10 displays an image, the common electrode layer 220 may be supplied with a common voltage, and the pixel electrodes 150 may be supplied with a data voltage. The electric field generated by the voltage difference between the common voltage and the data voltage may drive the TN liquid crystal layer 300 to achieve the required optical effects, such that the image displayed may have the desired brightness. At this time, the transparent conductive layer 160 may also be supplied with the common voltage. Hence, the transparent conductive layer 160, one of the pixel electrodes 150, and the second insulation layer 190 sandwiched between the transparent conductive layer 160 and the pixel electrodes 150 may together constitute a storage capacitor C. The capacitance effect provided by the storage capacitor C may help maintain the data voltage on the pixel electrodes 150 in the LCD panel 10 and may also stabilize the displayed image to a better extent. Since the transparent conductive layer 160, the pixel electrodes 150, and the second insulation layer 190 sandwiched between the transparent conductive layer 160 and the pixel electrodes 150 may all be made of a transparent material, the configuration of the storage capacitor C does not lead to an increase in the area of non-transparent (non-display) regions in the LCD panel 10, thus improving the display aperture ratio.

In the present embodiment, the transparent conductive layer 160 is located above and covers the gate lines 120, the data lines 130, and the TFTs 140. Thereby, the transparent conductive layer 160 may provide a shielding function and then prevent the capacitance coupling effect (caused by the data lines 130, the gate lines 120, and the TFTs 140) on the pixel electrodes 150. In most cases, when a capacitance coupling effect occurs between the pixel electrodes 150 and other components, the condition or the arrangement of the liquid crystal molecules in the TN liquid crystal layer 300 may be disturbed, which may result in light leakage at the edges of the pixel electrodes 150 or may lead to a residual image phenomenon. To resolve said issue, the TN liquid crystal layer 300 is often required to have restricted characteristics, e.g., the TN liquid crystal layer 300 is not easily disturbed. Nonetheless, the liquid crystal material that is not apt to be disturbed needs to be driven by a relatively large driving voltage, which fails to comply with the requirement for low power consumption.

Therefore, through the configuration of the transparent conductive layer 160, at least the aforesaid issue may be resolved according to the present embodiment. For instance, when the LCD panel 10 displays an image, the electric field formed in the TN liquid crystal layer 300 according to the present embodiment may not be easily disturbed after the data voltage is input to the pixel electrodes 150. This is because the capacitance coupling effect is not apt to occur between the pixel electrodes 150 and other components by the disposition of the transparent conductive layer 160. Although the TN liquid crystal layer 300 is made of the liquid crystal material which may be disturbed easily, light leakage or the residual image phenomenon is rather unlikely to occur because the influence of the capacitance coupling effect on the TN liquid crystal layer 300 is lessened. As a result, the TN liquid crystal layer 300 may have a wide range of characteristics according to the present embodiment.

In particular, a bend elastic constant K33 of the TN liquid crystal layer 300 ranges from about 8 pN to about 22 pN, and dielectric anisotropy $\Delta\in$ of the TN liquid crystal layer 300 ranges from 3 to 10, for instance. In the LCD panel 10 described in the present embodiment, the range of the bend elastic constant K33 and that of the dielectric anisotropy $\Delta\in$ of the TN liquid crystal layer 300 are relatively wide, which is conducive to the improvement of the design flexibility of the LCD panel 10. Designers and manufacturers may, based on the required response speed and driving voltage, modify or adjust the characteristics of the TN liquid crystal layer 300.

Figure 3A:
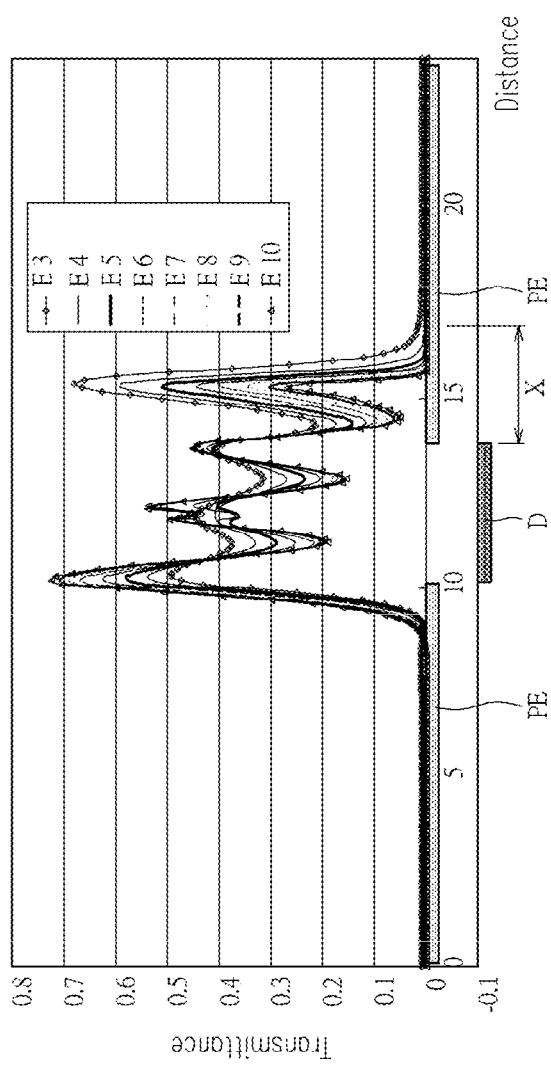
FIG. 3A to FIG. 3D are simulation diagrams showing the location versus the transmittance of an LCD panel for illustrating liquid crystal reverse induced-leakage regions.

For instance, FIG. 3A is a simulation diagram showing the location versus the transmittance of an LCD panel for illustrating liquid crystal reverse induced-leakage regions. Here, D denotes the data lines, PE denotes the pixel electrodes located at respective sides of the data lines, the horizontal axis represents the distance, and the vertical axis represents the transmittance rate. As shown in FIG. 3A, curves E3 to E10 respectively indicate that the dielectric anisotropy $\Delta\in$ of the liquid crystal layer is 3 to 10. Specifically, FIG. 3A is a simulation diagram schematically illustrating the brightness of a display panel when a dark-state voltage is applied to the pixel electrodes PE. At this time, the LCD panel is ideally in the dark state. It can be learned from FIG. 3A that most regions of the pixel electrodes PE are in the dark state. However, the position adjacent to the data lines D may be relatively bright because the liquid crystal molecules are apt to be affected by the coupling effect of the data lines D and may then be disturbed. The region around the data lines D with the relatively high brightness may be defined as the liquid crystal reverse induced-leakage region. Specifically, the lower the dielectric anisotropy $\Delta\in$, the wider the liquid crystal reverse induced-leakage region. This may worsen the light leakage at the edges of the pixel electrodes PE. As shown by the curve E3 in FIG. 3A, the width of the liquid crystal reverse induced-leakage region X may be greater than 2.5 nm, which poses a negative impact on the display aperture ratio of the LCD panel because the leakage region X are required to be shielded. Namely, if the liquid crystal layer with low dielectric anisotropy is utilized in an existing LCD panel, the excessive width of the liquid crystal reverse induced-leakage region X may result in the failure to comply with the requirement for high aperture ratio (HAR).

Figure 3B:
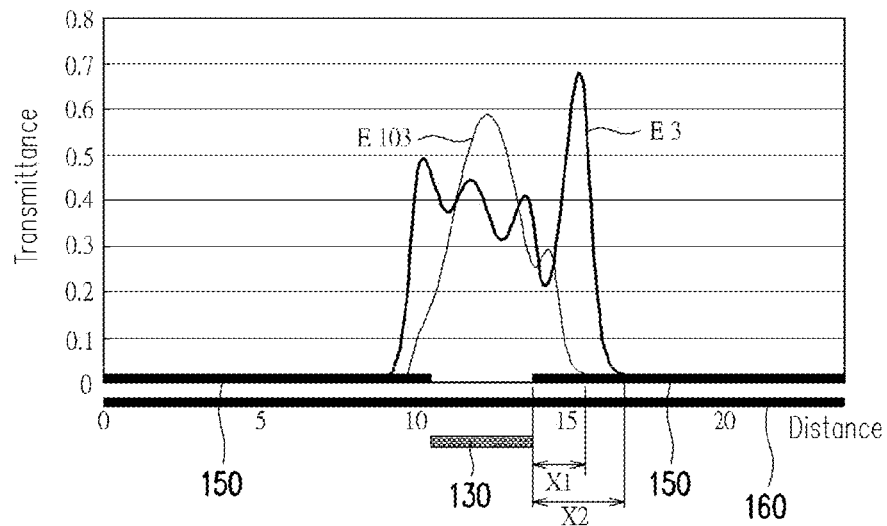

FIG. 3B is a simulation diagram simulation diagram showing the location versus the transmittance of an LCD panel for illustrating liquid crystal reverse induced-leakage regions. Here, the dielectric anisotropy ΔЄ of a liquid crystal layer employed in the LCD panel is 3. As shown in FIG. 3B, the curve E103 represents the brightness distribution of the LCD panel according to the present embodiment when the dielectric anisotropy ΔЄ of the liquid crystal layer employed in the LCD panel is 3, and the curve E3 shows the brightness distribution of an existing LCD panel when the dielectric anisotropy ΔЄ of the liquid crystal layer employed in the existing LCD panel is 3 as well. Besides, in FIG. 3B, the reference number 130 denotes the above-mentioned data lines, the reference number 150 denotes the above-mentioned pixel electrodes, and the reference number 160 refers to the above-mentioned transparent conductive layer as depicted in the embodiment of FIG. 1. When the liquid crystal layer with low dielectric anisotropy is employed, it may be observed from the curves E3 and E103 that the liquid crystal reverse induced-leakage region X1 of the above-mentioned LCD panel which may encounter the issue of edge light leakage is apparently smaller than the liquid crystal reverse induced-leakage region X2 of the existing LCD panel which may encounter the issue of edge light leakage. Here, the width of the liquid crystal reverse induced-leakage region X1 may be smaller than or equal to 1.5 μm, for instance.

Figure 3C:
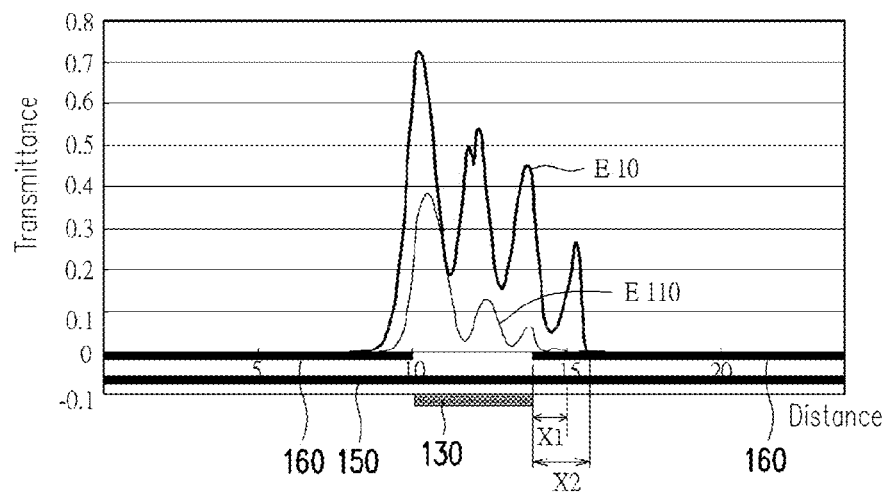

FIG. 3C is a simulation diagram schematically illustrating a liquid crystal reverse induced-leakage region in an LCD panel. Here, the dielectric anisotropy ΔЄ of a liquid crystal layer employed in the LCD panel is 10. As shown in FIG. 3C, the curve E110 shows the brightness distribution of the LCD panel of the present embodiment when the dielectric anisotropy ΔЄ of the liquid crystal layer employed in the LCD panel is 10, and the curve E10 shows the brightness distribution of an existing LCD panel when the dielectric anisotropy ΔЄ of the liquid crystal layer employed in the existing LCD panel is 10 as well. When the liquid crystal layer with dielectric anisotropy of 10 is employed, it may be observed from the curves E10 and E110 in FIG. 3C that the liquid crystal reverse induced-leakage region X1 of the above-mentioned LCD panel which may encounter the issue of edge light leakage is apparently smaller than the liquid crystal reverse induced-leakage region X2 of the existing LCD panel which may encounter the issue of edge light leakage.

Figure 3D:
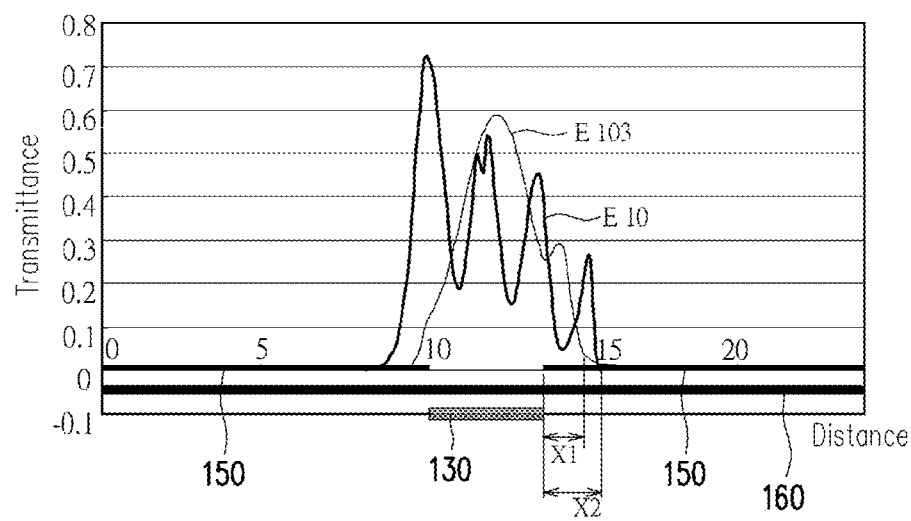

FIG. 3D schematically shows a liquid crystal reverse induced-leakage region in an LCD panel. Said curves E103 and E10 are depicted in FIG. 3D. Under normal circumstances, the lower the dielectric anisotropy of the liquid crystal layer, the larger the liquid crystal reverse leakage region. That is, the edge light leakage problem may be deteriorated. However, it may be learned (by comparing the curve E103 with the curve E10) that the liquid crystal reverse induced-leakage region X1 of the above-mentioned LCD panel which may encounter the issue of edge light leakage when the liquid crystal layer with low dielectric anisotropy of 3 is employed is still smaller than the liquid crystal reverse induced-leakage region X2 of the existing LCD panel which may encounter the issue of edge light leakage when the liquid crystal layer with high dielectric anisotropy of 10 is employed. That is, owing to the configuration of the transparent conductive layer 160 in the present embodiment, the edge light leakage problem may be effectively solved, such that the LCD panel described herein may have favorable display performance.

Figure 3E:
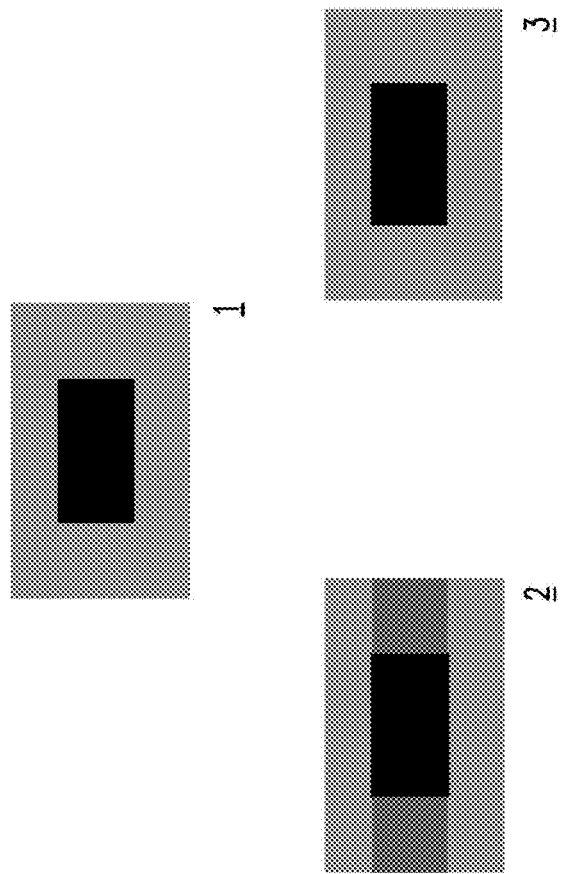
FIG. 3E schematically illustrates the display quality achieved by an LCD panel on which an image is being displayed.

FIG. 3E illustrates the display quality achieved by an LCD panel on which an image is being displayed. As shown in FIG. 3E, the image 1 is a default display image, for instance, the image 2 is the default display image displayed on an existing LCD panel, for instance, and the image 3 is the default display image displayed on the LCD panel 10 described in the present embodiment, for instance. In the conventional LCD panel, the pixel array substrate is not equipped with the transparent conductive layer described herein; therefore, the capacitance coupling effect may easily occur between the pixel electrodes and the components including scan lines, data lines, active devices, and so on. As shown by the image 2, the display quality (e.g., the residual image defect) of the conventional display panel is not satisfactory. By contrast, the transparent conductive layer 160 described in the present embodiment provides the shielding function, and therefore the image 3 displayed on the LCD panel described herein has the favorable display quality which is similar to that of the image 1. In particular, the lower the dielectric anisotropy of the liquid crystal layer, the lower the polarity of liquid crystal; thereby, the influence of the liquid crystal layer on residual charges may be lessened, and the residual image defect may be rectified in an efficient manner. In brief, the LCD panel 10 may be made of a wide range of materials and may also accomplish the favorable display effect.

To be more specific, a phase retardation value of the liquid crystal layer may affect the transmittance of the LCD panel, and the relation between the phase retardation value of the TN liquid crystal layer and the transmittance of the LCD panel may be represented by the following equation.

$$T = \frac{1}{2} - \frac{1}{2} \frac{\sin^2\left(\frac{\pi}{2}\sqrt{1 + \left(2d\frac{\Delta n}{\lambda}\right)^2}\right)}{1 - \left(2d\frac{\Delta n}{\lambda}\right)^2}$$

In this equation, Δn refers to birefringence of the liquid crystal layer, d denotes the thickness of the liquid crystal layer, and λ represents the wavelength of incident light. Here, the phase retardation value of the liquid crystal layer is defined as the product of Δn and d.

According to said equation, within the wavelength range of the common visible light, the smaller the phase retardation value, the smaller the transmittance of the LCD panel. By contrast, in the existing LCD panel, the pixel electrodes and the data lines need be separated, and thus the aperture ratio may not be raised. Accordingly, the phase retardation value of the liquid crystal layer is often required to fall within the range of 320~480, such that the resultant display brightness is sufficient.

In the LCD panel 10 depicted in FIG. 1, the transparent conductive layer 160 is configured below the pixel electrodes 150, and thereby the TN liquid crystal layer 300 is not apt to be disturbed by the coupling effect of the data lines 130 or other components. Hence, the edges of the pixel electrodes 150 may be aligned to the edges of the data lines 130; namely, when the edges of the pixel electrodes 150 and the edges of the data lines 130 are vertically projected onto the first substrate 110, the edges of the pixel electrodes 150 and the edges of the data lines 130 may be substantially overlapped. Thereby, the aperture ratio of the LCD panel 10 is raised. The structural design of components in the present embodiment may guarantee HAR; hence, the TN liquid crystal layer 300 may provide sufficient brightness even though the phase retardation value of the TN liquid crystal layer 300 is less than 320, and in the present embodiment, the phase retardation value of the TN liquid crystal layer 300 may range from 250 to 480. Namely, the LCD panel 10 described in the present embodiment is not only characterized by a wide selectable range of different dielectric anisotropy but also characterized by a wide selectable range of phase retardation values, which is conducive to an increase in the design margin of the LCD panel 10. Besides, when the phase retardation value of the TN liquid crystal layer 300 is relatively small, the display color of the LCD panel 10 appears to be a cool-tone color, so as to satisfy current users' requirements.

Figure 4A:
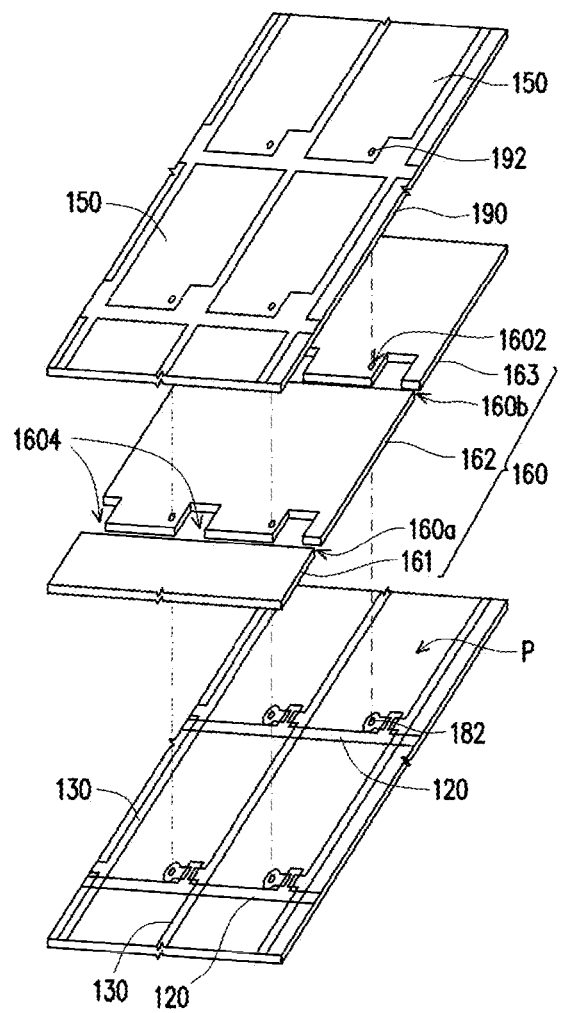
FIG. 4A is a schematic exploded view illustrating a pixel array substrate according to a second embodiment of the invention.
Figure 4B:
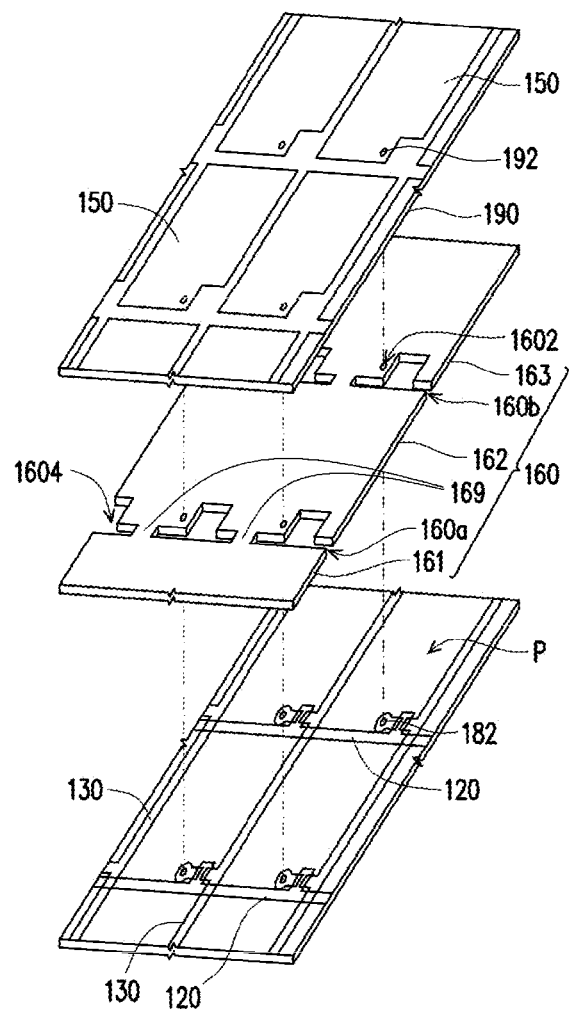
FIG. 4B is a schematic exploded view illustrating a pixel array substrate according to a third embodiment of the invention.

Note that the structural design of the pixel array substrate 100 described above should not be construed as a limitation to the invention, and several embodiments are provided below to describe the pixel array substrate. FIG. 4A to 4D are schematic partial exploded views illustrating a pixel array substrate respectively according to a second, a third, a fourth, and a fifth embodiments of the invention. With reference to FIG. 4A, FIG. 4B, FIG. 4C, and FIG. 4D, in some embodiments of the invention, the transparent conductive layer 160 may include a plurality of material blocks 161 to 163/164 to 167. As shown in FIG. 4A and FIG. 4B, the material blocks 161 to 163 are separated from one another, and each of the material blocks 161, 162, and 163 extends to and covers at least two pixel regions P. In particular, each of the material blocks 161, 162, and 163 extends to and covers at least two adjacent pixel regions P and the data lines 130 between the pixel regions P. According to an embodiment of the invention, the material blocks 161 and 162 are separated from each other by a gap 160a, and the material blocks 162 and 163 are separated from each other by a gap 160b. Each of the gaps 160a and 160b is overlapped with one of the gate lines 120, and a width of the gap 160a or a width of the gap 160b may be greater than or equal to the width of the corresponding gate line 120. Besides, in FIG. 4A and FIG. 4B, the transparent conductive layer 160 may have at least one opening 1604 that may expose the area occupied by the TFT. One of the differences between FIG. 4A and FIG. 4B lies in that the material blocks 161 and 162 are coupled by an electrical connection element 169, and the material blocks 162 and 163 are coupled by an electrical connection element 169 as well, such that the material blocks 161 and 162 are electrically connected together, and the material blocks 162 and 163 are electrically connected together.

Figure 4C:
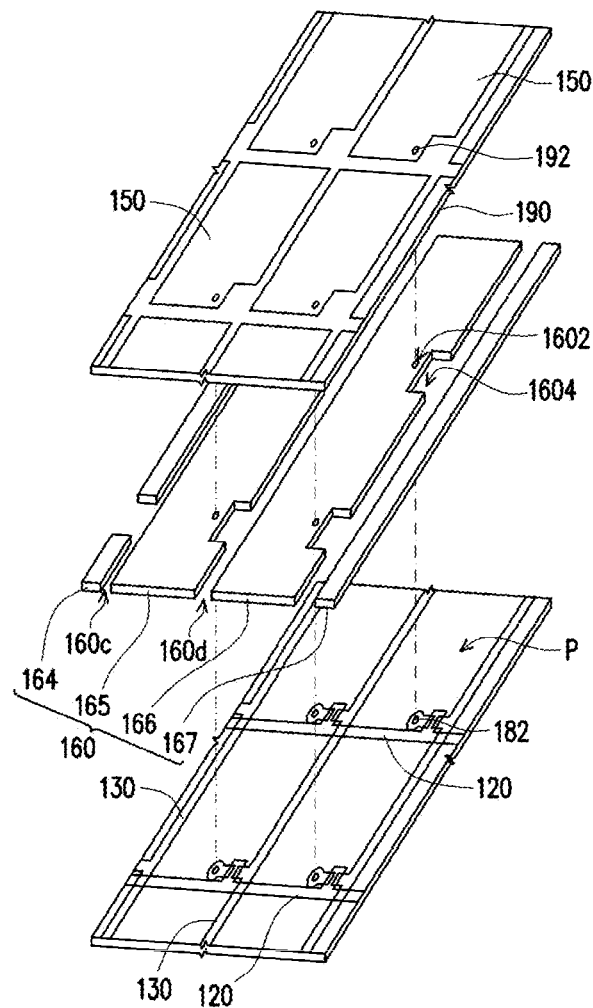
FIG. 4C is a schematic exploded view illustrating a pixel array substrate according to a fourth embodiment of the invention.
Figure 4D:
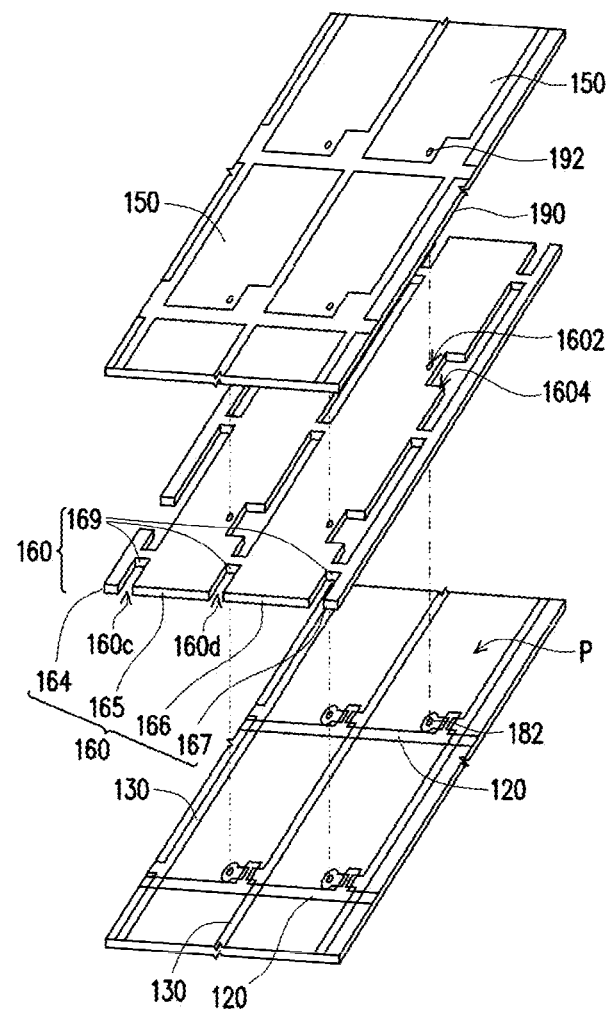
FIG. 4D is a schematic exploded view illustrating a pixel array substrate according to a fifth embodiment of the invention.

As shown in FIG. 4C and FIG. 4D, the material blocks 164 to 167 are separated from one another, and each of the material blocks 164, 165, 166, and 167 extends to and covers at least two pixel regions P. In particular, each of the material blocks 164, 165, 166, and 167 extends to and covers all the pixel regions P on the same straight line (substantially parallel to the data lines 130) and the gate lines 120 between the pixel regions P. The material blocks 164 and 165 are separated from each other by a gap 160c, the material blocks 165 and 166 are separated from each other by a gap 160d, and the material blocks 166 and 167 are separated from each other by a gap 160e. Each of the gaps 160c, 160d, and 160e is overlapped with one of the data lines 130. Here, a width of the gap 160c, a width of the gap 160d, or a width of the gap 160e may be greater than or equal to the width of the corresponding data line 130. Besides, according to the embodiment depicted in FIG. 4D, the transparent conductive layer 160 may further include a plurality of electrical connection elements 169. Each of the electrical connection elements 169 is electrically connected to any two adjacent material blocks 164, 165, 166, and 167.

Figure 5:
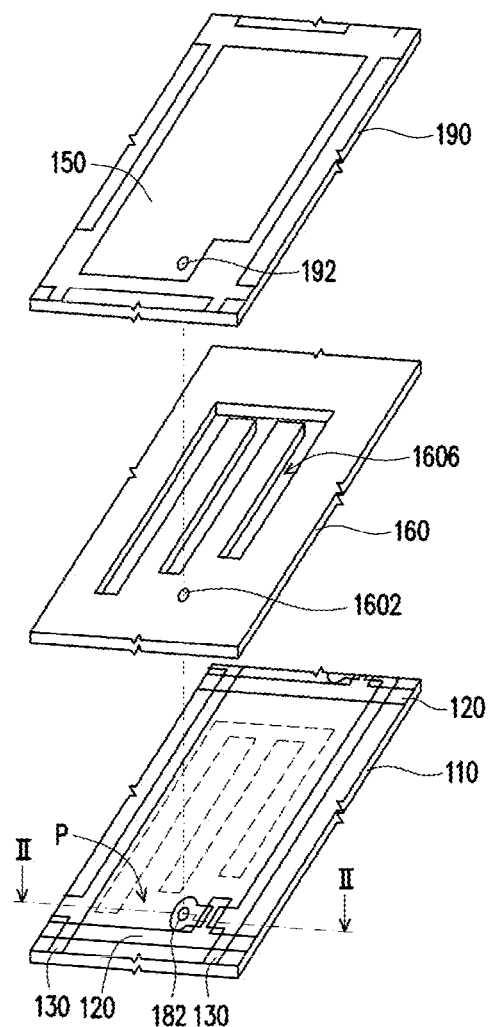
FIG. 5 is a schematic exploded view illustrating a pixel array substrate according to a sixth embodiment of the invention.
Figure 6:
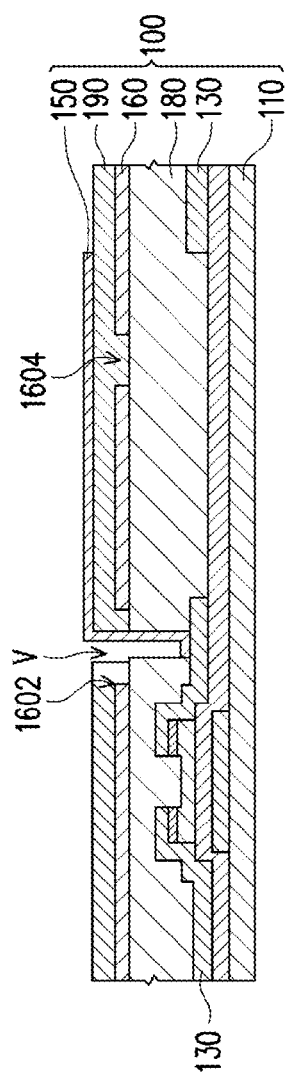
FIG. 6 is a cross-sectional view illustrating the pixel array substrate depicted in FIG. 5 and taken along a sectional line II-II.

FIG. 5 is a schematic exploded view illustrating a pixel array substrate according to a sixth embodiment of the invention. FIG. 6 is a cross-sectional view illustrating the pixel array substrate depicted in FIG. 5 and taken along a sectional line II-II. For illustrative purposes, in FIG. 5, the dotted lines on the pixel regions P represent the vertical projection of an opening 1606. With reference to FIG. 5 and FIG. 6, in some embodiments of the invention, the transparent conductive layer 160 may include at least one opening 1606. The opening 1606 is located between the first insulation layer 180 and the second insulation layer 190 and penetrates the transparent conductive layer 160. Here, the opening 1606 may serve to adjust the capacitance of the storage capacitor (Cst) constituted by the transparent conductive layer 160 and the pixel electrodes 150. Besides, the proper arrangement of the opening 1606 is also conducive to the adjustment of the resistance-capacitance (RC) load of the transparent conductive layer 160. The number of the opening 1606 may be singular or plural and may be arranged in different ways. For instance, the configuration of the openings 1606 may have an S shape, an S-like shape, an E shape, an E-like shape, a snake shape, a sawtooth shape, a sawtooth-like shape, a comb shape, or a comb-like shape. The configuration of the openings 1606 may also be shaped as stripes. However, the invention is not limited thereto.

To sum up, in the LCD panel described in an embodiment of the invention, the transparent conductive layer and the pixel electrodes together constitute the storage capacitor, such that the aperture ratio of the LCD panel with high resolution may be raised. Moreover, the capacitance coupling effect on the pixel electrodes caused by the components (i.e., the data lines, the gate lines, the TFTs, or a combination thereof) below the transparent conductive layer may be prevented by disposing the transparent conductive layer. Accordingly, the TN liquid crystal layer is less likely to be disturbed by the coupling capacitance and is rather not apt to encounter the light leakage issue while an image is displayed on the display panel. In particular, since the capacitance coupling effect is suppressed, the liquid crystal material may not be easily disturbed; thus, the selection of the liquid crystal material may become more flexible and less restrictive. As a result, the LCD panel described in the invention may be characterized by both a wide selectable range of liquid crystal materials and sufficient design flexibility.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A liquid crystal display panel comprising:
a pixel array substrate comprising:
a first substrate;
a plurality of gate lines disposed on the first substrate;
a plurality of data lines disposed on the first substrate;
a plurality of thin film transistors, each of the thin film transistors having a first end, a second end, and a third end, the first end being coupled to one of the gate lines, the second end being coupled to one of the data lines;
a first insulation layer covering the gate lines, the data lines, and the thin film transistors;
a transparent conductive layer disposed on the first insulation layer to provide a common voltage, the transparent conductive layer at least covering most portion of each data line and exposing the thin film transistors;

a second insulation layer covering the transparent conductive layer and the first insulation layer, wherein a plurality of contact holes penetrate the first and second insulation layers, and expose the third ends of the thin film transistors; and a plurality of pixel electrodes located on the second insulation layer and coupled to the thin film transistors through the contact holes, wherein the second insulation layer is located between the transparent conductive layer and the pixel electrodes and isolates the transparent conductive layer from the pixel electrodes, and the transparent conductive layer, the second insulation layer, and the pixel electrodes constitute a storage capacitor;

an opposite substrate opposite to the pixel array substrate, the opposite substrate comprising a second substrate and a common electrode layer disposed on the second substrate; and a twisted nematic liquid crystal layer located between the pixel array substrate and the opposite substrate, wherein a phase retardation value of the twisted nematic liquid crystal layer ranges from 250 nm to 480 nm, and a dielectric anisotropy $\Delta\varepsilon$ of the twisted nematic liquid crystal layer ranges from 3 to 10.

2. The liquid crystal display panel as recited in claim 1, wherein the transparent conductive layer comprises a plurality of first openings, the first openings are greater than the contact holes, and each of the contact holes are located within one of the first openings, and the second insulation layer covers sidewalls of the first openings of the transparent conductive layer.

3. The liquid crystal display panel as recited in claim 2, wherein the transparent conductive layer further comprises a plurality of second openings respectively located above the thin film transistors.

4. The liquid crystal display panel as recited in claim 2, wherein the transparent conductive layer further comprises a plurality of second openings respectively located above the gate lines.

5. The liquid crystal display panel as recited in claim 2, wherein each of the contact holes comprises a first through hole and a second through hole, and the first through hole penetrates the first insulation layer, the second through hole penetrates the second insulation layer.

6. The liquid crystal display panel as recited in claim 1, wherein a material of the first insulation layer and the second insulation layer comprises an inorganic insulation material or an organic insulation material.

7. The liquid crystal display panel as recited in claim 6, wherein the inorganic insulation material comprises silicon oxide, silicon nitride, silicon oxynitride, or a combination thereof.

8. The liquid crystal display panel as recited in claim 6, wherein the organic insulation material comprises acrylic, epoxy resin, a color filter material, or a combination thereof.

9. The liquid crystal display panel as recited in claim 1, wherein a thickness of the first insulation layer ranges from about 0.2 μm to about 3 μm.

10. The liquid crystal display panel as recited in claim 1, further comprising a color filter layer, the color filter layer being located on the opposite substrate and between the second substrate and the common electrode layer.

11. The liquid crystal display panel as recited in claim 1, wherein a bend elastic constant K33 of the twisted nematic liquid crystal layer ranges from about 8 pN to about 22 pN.

* * * * *